United States Patent
Yin et al.

(10) Patent No.: US 10,660,062 B1
(45) Date of Patent: May 19, 2020

(54) INDOOR POSITIONING

(71) Applicant: INTERNATIONAL BUSINESS MACHINES CORPORATION, Armonk, NY (US)

(72) Inventors: Yong Yin, Beijing (CN); Dong Hui Liu, Beijing (CN); Jia Yu, Beijing (CN); Jia Tian Zhong, Haidian District Beijing P.R (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/353,086

(22) Filed: Mar. 14, 2019

(51) Int. Cl.
  *H04W 4/02* (2018.01)
  *H04W 64/00* (2009.01)
  *G01C 21/20* (2006.01)
  *G01S 11/06* (2006.01)
  *G01S 5/02* (2010.01)

(52) U.S. Cl.
  CPC ........ *H04W 64/006* (2013.01); *G01C 21/206* (2013.01); *G01S 5/0252* (2013.01); *G01S 11/06* (2013.01); *H04W 4/027* (2013.01)

(58) Field of Classification Search
  CPC .................................................. H04W 64/00
  See application file for complete search history.

(56) References Cited

U.S. PATENT DOCUMENTS

| 8,531,523 | B2 * | 9/2013 | Anderson | ............... | H04W 4/02 |
| | | | | | 348/143 |
| 2016/0094951 | A1 * | 3/2016 | Yang | .................... | H04W 4/029 |
| | | | | | 455/456.1 |

FOREIGN PATENT DOCUMENTS

| CN | 103561462 A | 2/2014 |
| CN | 106658708 A | 5/2017 |
| CN | 106792559 A | 5/2017 |
| CN | 106793086 A | 5/2017 |

(Continued)

OTHER PUBLICATIONS

Emaraic, "Real-time Distance Measurement Using Single Image," Emaraic.com; URL: http://emaraic.com/blog/distance-measurement. Retrieved Mar. 12, 2019. 7 pages.

(Continued)

*Primary Examiner* — Michael T Vu
(74) *Attorney, Agent, or Firm* — Cantor Colburn LLP; Teddi Maranzano

(57) ABSTRACT

Methods, systems and computer program products for updating a wireless-based location records database to provide more accurate indoor positioning are provided. Aspects include receiving a wireless-based location records database including a plurality of wireless-based location records. Aspects also include receiving Wi-Fi data and gait data from a user device. Aspects also include determining an approximate location of a user associated with the user device based on the Wi-Fi data and the plurality of wireless-based location records. Aspects also include receiving image capture data from one or more image capture devices viewing the approximate location of the user. Aspects also include identifying the user based on the image capture data and the gait data. In response to determining an accurate location of the user based on the image capture data, aspects include updating the wireless-based location records database.

19 Claims, 8 Drawing Sheets

(56) References Cited

FOREIGN PATENT DOCUMENTS

CN 103957503 B 12/2017
CN 105674985 B 4/2018

OTHER PUBLICATIONS

He, et al., "Wi-Fi Fingerprint-Based Indoor Positioning: Recent Advances and Comparisons," IEEE Communications & Tutorials, vol. 18, No. 1, First Quarter 2006, pp. 1-25.
Rosebrock, "Measuring distance between objects in an image with OpenCV," Apr. 4, 2019, PyImageSearch.com; URL: https://www.pyimagesearch.com/2016/04/04/measuring-distance-between-objects-in-an-image-with-opencv/. Retrieved Mar. 12, 2019. 32 pages.
Teixeira, et al., "PEM-ID: Identifying people by gait-matching using cameras and wearable accelerometers," 2009 Third ACM/IEEE International Conference on Distributed Smart Cameras (ICDSC), Como, 2009, pp. 1-8.
Waqar, et al., "Smartphone positioning in sparse Wi-Fi environments," Computer Communications, vol. 73, Part A, Jan. 1, 2016, pp. 108-117.
Wikipedia, "Wi-Fi positioning system" Wikipedia.org; URL: https://en.wikipedia.org/wiki/Wi-Fi_positioning_system. Retrieved Mar. 12, 2019. 5 pages.
Zhang, et al., "GraphSLAM-based Crowdsourcing framework for indoor Wi-Fi fingerprinting," 2016 Fourth International Conference on Ubiquitous Positioning, Indoor Navigation and Location Based Services (UPINLBS), Shanghai, 2016, pp. 61-67.

\* cited by examiner

US 10,660,062 B1

INDOOR POSITIONING

BACKGROUND

The present invention generally relates to mobile device positioning, and more specifically, to updating a wireless-based location records database to provide more accurate indoor positioning.

A global positioning system (GPS) is commonly used by mobile devices, such as smartphones, to determine the location of the mobile device. While such commercially available GPS systems can provide meter-level location accuracy in open environments, GPS signals are often ineffective for indoor positioning as GPS signals will be attenuated and scattered by indoor environments. Accordingly, positioning technology based on Wi-Fi, RFID, acoustic signals and the like have been developed for more accurate indoor positioning. Wi-Fi indoor positioning systems typically operate based on a wireless-based location record (which may alternatively be referred to as "fingerprints") positioning method that involves mapping wireless access point (WAP) signals strengths ("wireless-based location record database") for a plurality of locations during a setup phase that is manually performed. The location of a wireless device can then be determined by comparing the signal strengths of the WAPs detected by the wireless device to the map of wireless-based location records. However, because the detected signal strengths (and thus the accuracy of the Wi-Fi positioning system) are affected by changing environmental factors such as the layout of a room, it is often necessary to periodically update the wireless-based location records database.

SUMMARY

Embodiments of the present invention are directed to a computer-implemented method for updating a wireless-based location records database to provide more accurate indoor positioning. A non-limiting example of the computer-implemented method includes receiving a wireless-based location records database including a plurality of wireless-based location records. The method also includes receiving Wi-Fi data and gait data from a user device. The method also includes determining an approximate location of a user associated with the user device based on the Wi-Fi data and the plurality of wireless-based location records. The method also includes receiving image capture data from one or more image capture devices viewing the approximate location of the user. The method also includes identifying the user based on the image capture data and the gait data. Responsive to determining an accurate location of the user based on the image capture data, the method also includes updating the wireless-based location records database.

Embodiments of the present invention are directed to a system for updating a wireless-based location records database to provide more accurate indoor positioning. The system includes a memory having computer readable computer instructions, and a processor for executing the computer readable instructions. The computer readable instructions include instructions for receiving a wireless-based location records database including a plurality of wireless-based location record. The computer readable instructions also include instructions for receiving Wi-Fi data and gait data from a user device. The computer readable instructions also include instructions for determining an approximate location of a user associated with the user device based on the Wi-Fi data and the plurality of wireless-based location records. The computer readable instructions also include instructions for receiving image capture data from one or more image capture devices viewing the approximate location of the user. The computer readable instructions also include instructions for identifying the user based on the image capture data and the gait data. Responsive to determining an accurate location of the user based on the image capture data, the computer readable instructions also include instructions for updating the wireless-based location records database.

Embodiments of the invention are directed to a computer program product for updating a wireless-based location records database to provide more accurate indoor positioning, the computer program product comprising a computer readable storage medium having program instructions embodied therewith. The computer readable storage medium is not a transitory signal per se. The program instructions are executable by a processor to cause the processor to perform a method. A non-limiting example of the method includes receiving a wireless-based location records database including a plurality of wireless-based location records. The method also includes receiving Wi-Fi data and gait data from a user device. The method also includes determining an approximate location of a user associated with the user device based on the Wi-Fi data and the plurality of wireless-based location records. The method also includes receiving image capture data from one or more image capture devices viewing the approximate location of the user. The method also includes identifying the user based on the image capture data and the gait data. Responsive to determining an accurate location of the user based on the image capture data, the method also includes updating the wireless-based location records database.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
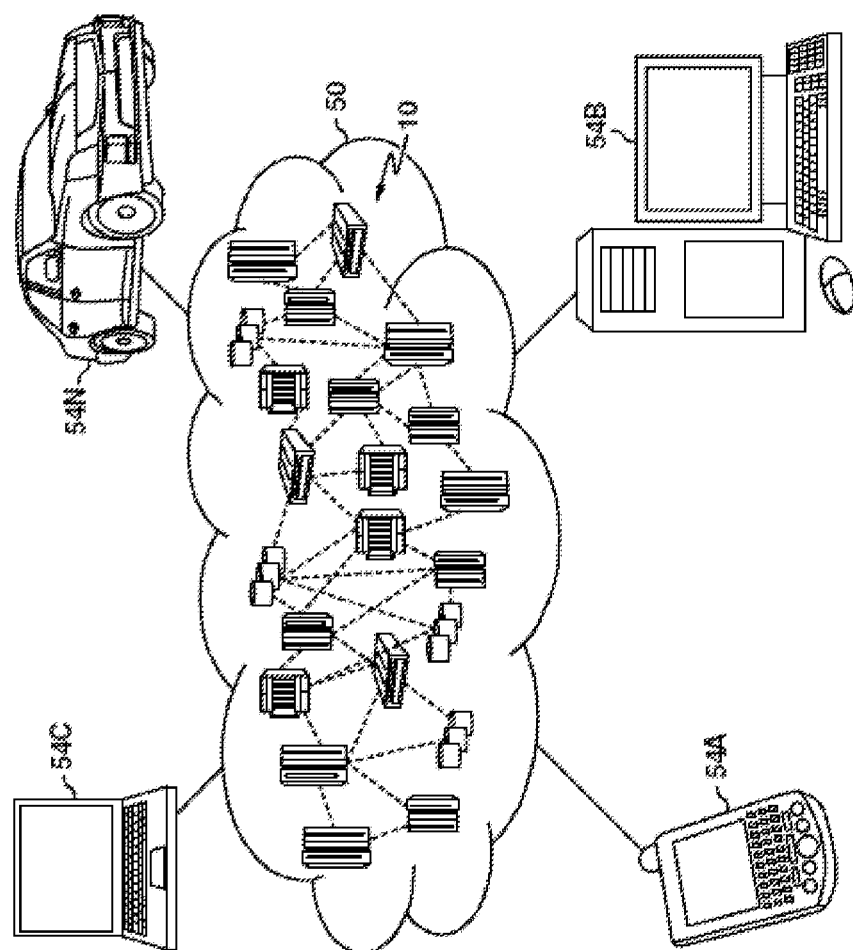
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
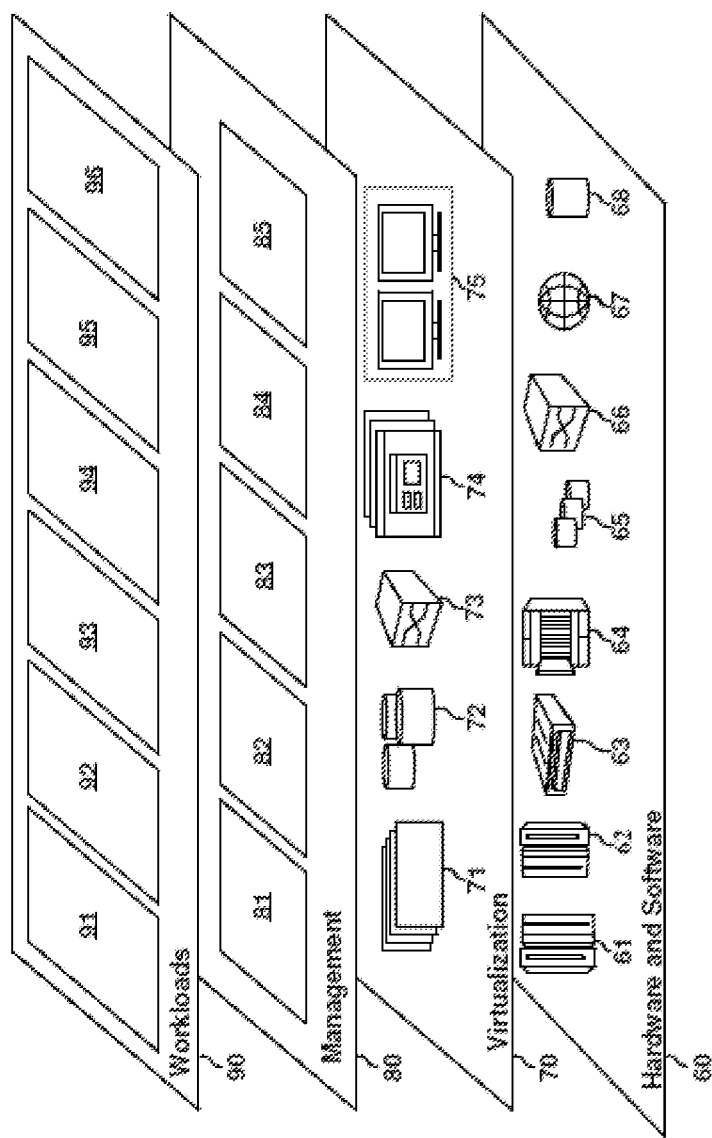
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating a wireless-based location records database to provide more accurate indoor positioning 96.

Figure 3:
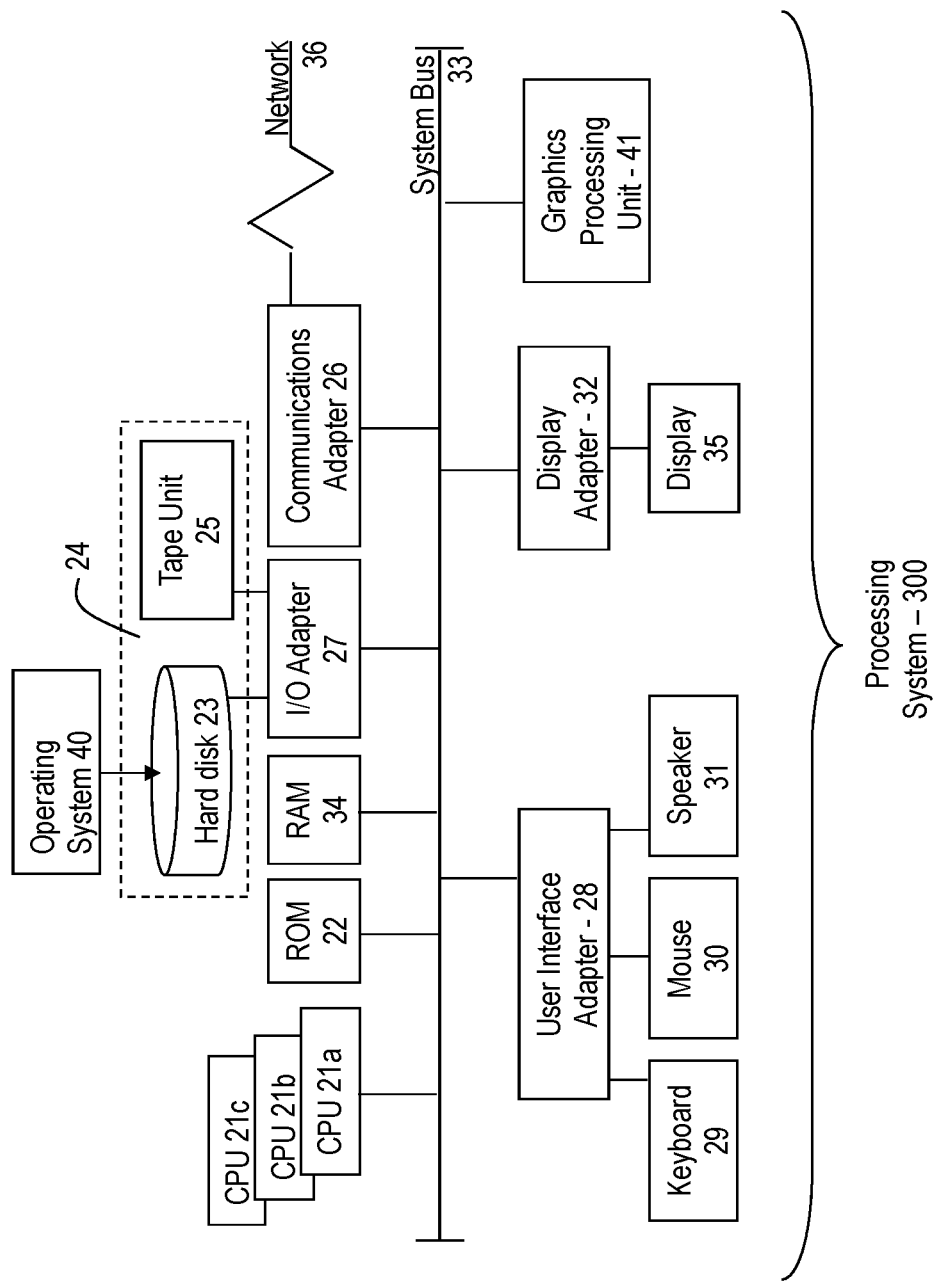
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4B:
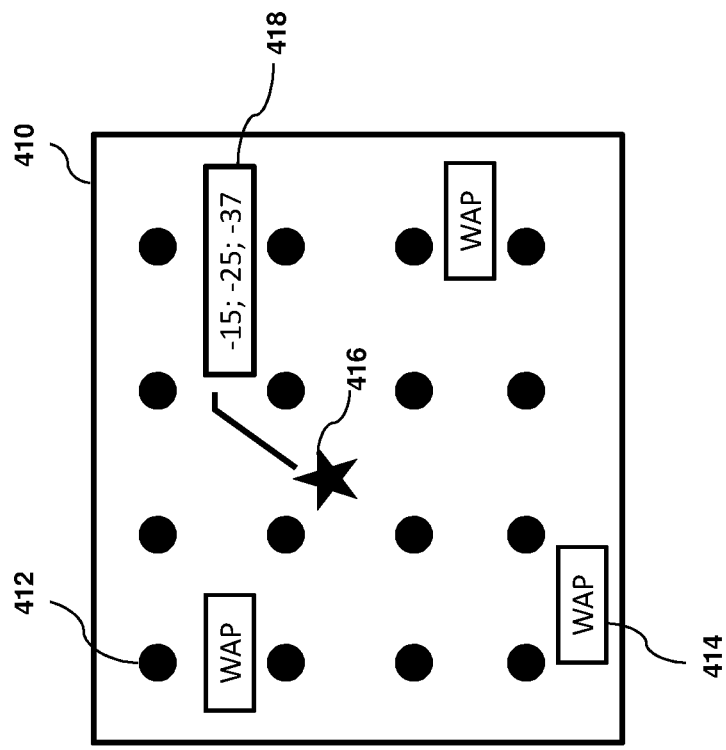
FIG. 4B depicts a site map of a Wi-Fi indoor localization system according to one or more embodiments of the present invention.
Figure 4A:
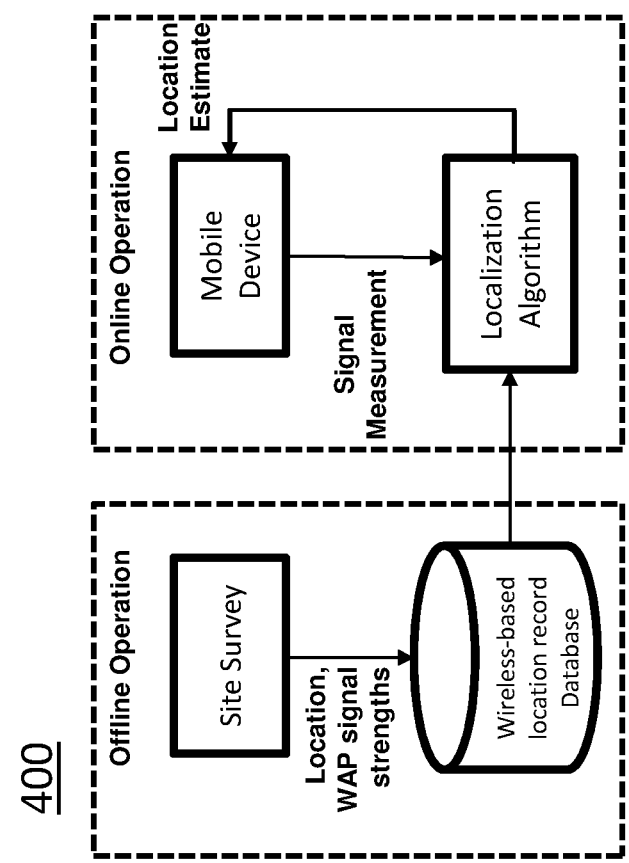
FIG. 4A depicts a basic system flow of a Wi-Fi indoor localization system according to one or more embodiments of the present invention.

FIG. 4A depicts a system flow 400 for a Wi-Fi localization system. Conventionally, Wi-Fi localization systems has two modes: 1) offline and 2) online. The Wi-Fi localization system is generally placed in the offline state in order to initialize a wireless-based location record database. As shown, a site survey is manually performed to obtain wireless-based location record at a plurality of reference points (i.e., known locations). A "wireless-based location record" may refer to the detected signal strengths of a plurality of different wireless access points (WAPs) at a given reference point. Thus, the wireless-based location records database may include a plurality of records of reference points and their corresponding wireless-based location records. For example, as shown in FIG. 4B, a plurality of reference points 412 may form a grid within a room 410. In the example shown in FIG. 4B, there are three different WAPs 414 in the room 410 at different locations, and a wireless-based location record associated with each reference point 412 would be represented by the respective signal strengths of each of the three WAPs 414 as measured at the reference point.

Referring back to FIG. 4A, once the wireless-based location records database has been initialized, the system may be placed in the online state where the location of a wireless device 416 may be estimated based on the wireless-based location records database and the WAP signal strengths 418 detected by the subject wireless device. Such detected WAP signal strengths 418 may also be referred to as a received signal strength indicator (RSSI) or RSSI vector. The system may receive the signal measurements from the wireless device, apply a localization algorithm based on the wireless-based location records database and generate a location estimate. For example, as shown in FIG. 4B, a user may be standing in approximately the middle of a room and the mobile device 416 of the user may detect the signal strengths of each of the three respective WAPs 414. These detected signal strengths 418 may be passed to the system which can compare the detected signal strengths to the wireless-based location records database to estimate the location of the user. For example, as shown in FIG. 4B, the user may be positioned within a rectangular area that has corners defined by four different reference points 412. By comparing the detected signal strengths 418 of the mobile device 416 to the various wireless-based location records stored by the wireless-based location records database, the system may determine that the user is positioned within a particular set of reference points 412. In some embodiments, the system may identify the reference point having a wireless-based location record that is most similar to the RSSI vector of the wireless device by comparing some similarity metric in the signal space, such as for example, Euclidean distance. In some embodiments, the position of the wireless device can be estimated based on one or more of the most similar nearby reference points and wireless-based location records.

While such indoor Wi-Fi positioning systems are typically fairly accurate, environmental changes can have a significant impact of the accuracy of the positioning. For example, the addition or removal of walls or large furniture or even the opening/closing or doorways can change a wireless-based location record observed (i.e., the detected signal strengths) at a given location. Likewise, movement or removal of one or more WAPs can also change a wireless-based location record observed at a given location. Thus, it is typically necessary to periodically update the wireless-based location records database by performing further offline site surveys to obtain updated wireless-based location records. Such updating can be performed by manually measuring the signals at each reference point, but this requires significant time and effort. While some methods of automatically updating wireless-based location records attempt to address this problem, such methods have limitations and drawbacks, such as requiring other equipment (e.g., filters) or requiring changes to the WAPs. Thus, embodiments of the present disclosure provide a technical improvement over such systems by allowing for automatic updates to wireless-based location records databases without requiring additional equipment or changes to WAPs.

In exemplary embodiments, a system for updating a wireless-based location records database to provide more accurate indoor positioning is provided. In exemplary embodiments, the system can leverage image-based positioning and gait data in conjunction with Wi-Fi-based positioning to automatically update a wireless-based location records database to provide more accurate indoor positioning. For example, in addition to detected WAP signal strengths, a mobile device may also provide the system with gait data that corresponds to the movements of the mobile device. The system can determine an approximate location of the user based on the detected WAP signal strengths and the wireless-based location records database. A more accurate and/or precise position of the user can be determined by performing image analysis of the approximate location to visually identify the person carrying the mobile device by correlating the gait data with the observed movements of individuals in the approximate location. Once the person carrying the mobile device is visually identified, the system can then use visual analysis techniques to calculate a more accurate/precise location of the person by, for example, comparing the location of the person to visual landmarks of known positions. When an accurate location of the person has been determined, the wireless-based location records database can be automatically updated to reflect a new wireless-based location record based on the detected WAP signal strengths in relation to the determined accurate location. In this way, the system can automatically (continuously or intermittently) update the wireless-based location records database to continue to provide the accurate and accurate location information. According to some embodiments, the system may also provide improved gait recognition by using image feature recognition. Accordingly, embodiments of the present invention can provide the benefits of reducing the cost of updating the wireless-based location records database, improving indoor position accuracy (e.g., from tens of meters to several meters) and can detect changes relating to WAPs in a timely manner. Such accurate indoor positioning can be utilized in any number of applications. For example, a user device 520 may include a mobile application that provides a map of a store that a user can use to navigate to items in the store that the user is looking for. Such mobile applications may not be feasible or useful without having accurate indoor positioning, as is provided by embodiments of the invention described herein.

Figure 5:
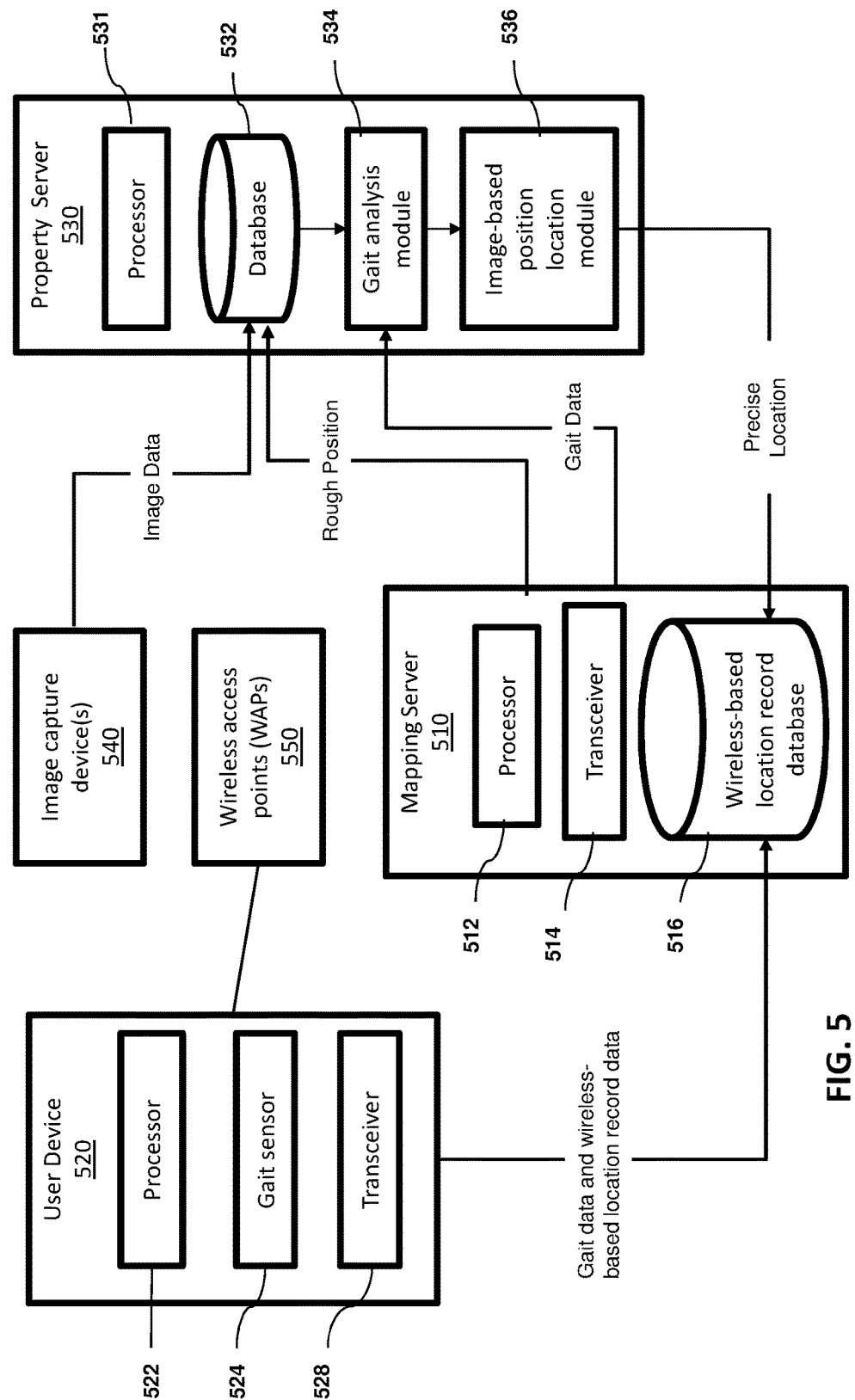
FIG. 5 depicts a system upon which updating a wireless-based location records database to provide more accurate indoor positioning may be implemented according to one or more embodiments of the present invention.

Turning now to FIG. 5, a system 500 for updating a wireless-based location records database to provide more accurate indoor positioning will now be described in accordance with an embodiment. The system 500 can include a mapping server 510 in communication with a user device 520, a property server 530, image capture device(s) 540, and wireless access points (WAPs) 550 via, for example, a communications network, wired. The communications network may be one or more of, or a combination of, public (e.g., Internet), private (e.g., local area network, wide area network, virtual private network), and may include wireless and wireline transmission systems (e.g., satellite, cellular network, terrestrial networks, etc.). Wireless access points 550 can be any Wi-Fi access point having a broadcast channel signal strength that user device 520 can detect. Note that it is not required that user device 520 connect to any WAP 550, so it does not matter whether a WAP 550 requires a password or not for connection. Although FIG. 5 depicts mapping server 510 and property server 530 as separate devices, in some embodiments the functions of these devices may be combined into a single device. Further, although this disclosure is generally directed to the use of Wi-Fi signals, it should be understood that is contemplated that these systems, methods, and techniques disclosed herein are not so limited and may be used with other wireless communication networks such as for example, cellular networks and wireless sensor networks.

In exemplary embodiments, a mapping server can include a processor 512 for executing the functionality described herein, a transceiver 514 or other communication interface for communicating with one or more other devices of system 500 and a wireless-based location records database 516 for storing wireless-based location records in association with respective reference points. A reference point may be a known location within an indoor area (e.g., represented as Cartesian coordinates, a vector, or the like). A wireless-based location record can be a set of signal strengths, where each signal strength of the set corresponds to a signal strength of one of a plurality of WAPs detected at the reference point. For example, a user may stand on at a reference point with a smartphone and measure the signal strengths of each of a plurality of WAPs and these measured signal strengths can make up the wireless-based location record that is associated with that reference point. According to some embodiments, wireless-based location records database 516 can also store gait data received from one or more user devices 520. As shown in FIG. 5, mapping server 510 can be configured to receive gait data and wireless-based location record data (i.e., location and Wi-Fi signal strengths) from one or more user devices 520. As described above, system 500 may be initialized in an offline phase in which the wireless-based location records database is initially created by determining wireless-based location records for a plurality of reference points. Mapping server 510 may store the wireless-based location records database and automatically update it as described herein.

According to some embodiments, mapping server 510 can determine a rough position of a user device 520 based on the wireless-based location records database and WAP signal strengths detected by the user device 520. For example, as shown above in FIGS. 4A-B, mapping server 510 can compare the WAP signal strengths received from the user device 520 to the wireless-based location records of the stored wireless-based location records database to determine the approximate location of the user device 520. As will be appreciated by those of skill in the art, a positioning algorithm can be applied to the received WAP signal strengths to extrapolate the approximate location of the user device 520. According to some embodiments, the approximate position of the user device 520 and the gait data received from the user device 520 can be transmitted to the property server 530 for further processing. In some embodiments, this information may be transmitted in the form of a tuple having the form: (time, approximate location, gait data). As shown by FIG. 5, following processing by the property server 530, mapping server 510 may receive an accurate location of the user associated with the user device 520 which can then be transmitted to the user device 520 or other devices or applications as needed. Furthermore, in some embodiments, in response to receiving the accurate location of the user associated with the user device 520, the mapping server 510 may update the wireless-based location records database to include a new wireless-based location record corresponding to the accurate location of the user and the signal strengths received from the user device 520. In this way, the mapping server 510 may repeatedly update the wireless-based location records database to reflect any changes in the environment that may have distorted wireless-based location records measured during the initialization process. According to some embodiments, the mapping server 510 may update the wireless-based location records database by adjusting one or more of the previously saved wireless-based location records based on the signal strengths received from the user device 520 and the determined accurate location of the user. For example, in some embodiments, if a stored wireless-based location record and a new wireless-based location record have matching location, the new wireless-based location record may simply replace the stored wireless-based location record in the wireless-based location records database, thereby having the effect of updating the RSSI vectors that is stored in association with the location. According to some embodiments, old records (i.e., stored records that have a location that matches the location of a new record) may not be erased, but may be maintained by the wireless-based location records database and may be used in combination with new records to determine a location of a user device 520 based on further location requests.

In exemplary embodiments, a user device 520 can include, but is not limited to being, a smartphone, a wearable device such as a smartwatch, an augmented reality headset, a tablet, a computer system such as the one shown in FIG. 3, or any other suitable electronic device. The user device 520 includes a processor 522, a gait sensor 524 for obtaining gait data and a transceiver 528. User device 520 may also include a storage device or memory for, for example, storing detected signal strengths of WAPs and gait data obtained by gait sensor 524. According to some embodiments, a gait sensor 524 may be a gyroscope, an accelerometer or any other sensor that is capable of measuring one or more of orientation, direction, movement, altitude, velocity, and/or acceleration. In some embodiments, the user device 520 can include an input device, such as a keyboard (either physical or digital) for receiving user input text. Text can also be input orally via a microphone using voice recognition. In some embodiments, a user device 520 can include a display that is configured to display, for example, the determined location of the user generated by the system 500. In some embodiments, the display can be a touchscreen that may be configured to detect tactile user inputs (e.g., typing, pressing, swiping, etc.). Transceiver 528 can be configured to allow a user device 520 to communicate with other devices via a communications network (e.g., via Wi-Fi, cellular communications, etc.). As shown in FIG. 5, a user device 520 can be configured to collect gait data and wireless-based location record data (i.e., detected WAP signal strengths) and transmit them to mapping server 510 for analysis. According to some embodiments, user device 520 may include an application or other software that allows a user of user device 520 to opt-in to the system in order to provide the system (e.g., mapping server 510) with the gait data and Wi-Fi data collected by the user device 520. According to some embodiments, user device 520 may obtain, store, and transmit data to mapping server 510 in the form of a tuple having the form: (time, RSSI vector, gait data).

In some embodiments, a property server 530 can include a processor 531, a memory 532, a gait analysis module 534 and an image-based position location module 536. As shown in FIG. 5, property server 530 can receive the rough position of a user or user device 520 and gait data associated with the user device 520 for processing. According to some embodiments, the property server 530 may access or retrieve images or video from one or more image capture devices 540 (e.g., video cameras) that are configured to view the approximate location of the user. For example, property server 530 may store a map of an indoor area (e.g., a map of a room) and associated map of video camera coverage of the indoor area (e.g., various sub-areas of the indoor area that are within view of various respective cameras) and may determine one or more cameras that are viewing an area that encompasses the approximate location of the user. According to some embodiments, an image capture device 540 may be remotely controllable and property server 530 may cause an image capture device 540 to rotate and/or zoom in/out on an area corresponding to the approximate location of the user. The property server 530 may receive image and/or video data of the approximate location of the user from one or more image capture devices 540.

As shown in FIG. 5, property server 530 includes a gait analysis module 534 that is configured to identify a person that is associated with a user device 520 from a plurality of people that are located in or near the approximate location of the user device 520. For example, mapping server 510 may determine that the approximate location of a user of user device 520 based on the Wi-Fi data provided by user device 520, however, when property server receives a video feed of the approximate area, there may be two or more people shown in the video so it may not be immediately clear which of the two or more people is the person that is associated with user device 520. However, gait analysis module 534 can identify the person that is associated with user device 520 performing an analysis of the gait data provided by user device 520 in combination with an image analysis of the movements of the two or more people shown in the video(s) provided by image capture device(s) 540. As will be appreciated by those of skill in the art, gait analysis module 534 may identify the person associated with the user device 520 by, for example, segmenting each person in the scene and extracting, based on an analysis of the video, a motion signature describing landmark features of the person's gait. Generally, the system may require observance of a threshold number of steps to adequately extract the motion signature from the video. For example, the system may require an unobstructed view (e.g., a view of the person's legs) for a threshold amount of ten steps in order to sufficiently extract the motion signature from the video. The same motion properties (e.g., vertical acceleration) can be extracted from the gait data provided by gait sensor 524 of user device 520 by applying one or more algorithms to the data and the person can be identified by determining which person of the people in the scene has a motion signature that most closely matches that of the gait data. For example, as will be understood by those of skill in the art, the system may determine a personal "motion signature" of a person based on the timestamps of two landmark events of the person's gait cycle, such as the heel-strike and midswing events. In the case where property server 530 receives multiple sets of gait data from multiple user devices 520 in the same approximate area simultaneously, the people can be matched to their respective user devices 520 by clustering the signals to obtain matching pairs of gait-motion data. The system can receive a device identifier, such as a device ID, MAC address or the like to associate a device with the identified person. According to some embodiments, the system may record one or more visual features of a person that has been identified by the system 500 as being associated with a particular user device 520, such as for example, one or more images of the person's face or clothes, or a clothing pattern. Thus, after a person has been identified by the system 500 as having been associated with a particular user device 520, if that same person moves to another location and is later analyzed by the system again, the system may substitute or augment the gait analysis with a feature matching analysis, such that the system may not require observance of the previous threshold amount of steps to identify the person as being associated with the user device 520 at the new location. For example, if a person in a yellow polka dotted shirt is walking through a department store, the system may identify the person as being associated with a first device at a first location as described above (e.g., based on combined gait and video analysis) and store the feature of the yellow polka dotted shirt in association with the device ID of the user device 520. Then, if the person moves to a portion of the department store where there are lots of clothes racks that obscure a view of the person's legs while walking, the system may nonetheless utilized the stored feature of the yellow polka dotted shirt to help once again identify the person as being associated with the user device in a case where the person's legs are only visible for three steps. Thus, in some embodiments, the gait analysis module 534 provides an improvement of utilizing stored image features to assist in a subsequent identification of a previously-identified person where less image/video data of the person's motion is available at the new location.

According to some embodiments, property server 530 includes an image-based position location module 536 that can be configured to identify a location of a person based on an analysis of images or video of the person. For example, as will be understood by those of skill in the art, image-based position location module 536 can measure distances between an object and one or more reference points in an image that are captured by an image capture device 540, such as for example, a surveillance camera. In this context, a "reference point" may refer to an object or portion of a wall, floor or ceiling (e.g., an "X" marked on a wall), which has a known location that can be used to determine the location of a nearby person. For example, a predetermined reference point may be visually identifiable by image-based position location module 536 within an image or video, and known visual distance measuring techniques may be applied to the image or video to determine the distance between the reference point and the person that has been identified as being associated with the user device 520. According to some embodiments, the image-based position location module 536 can determine an accurate position of the person by, for example, taking multiple distance measurements between the person and a corresponding set of multiple reference points and then calculating the location of the object based on the measured distances and the known positions of the reference points. The accurate location of the person associated with the user device 520 can then be transmitted from the property server 530 to the mapping server 510 and ultimately back to the user device 520 or one or more other devices or applications (e.g., a store map application on user device 520. According to some embodiments, property server 530 may transmit data to mapping server 510 in the form of a tuple having the form: (time, accurate location).

Figure 6:
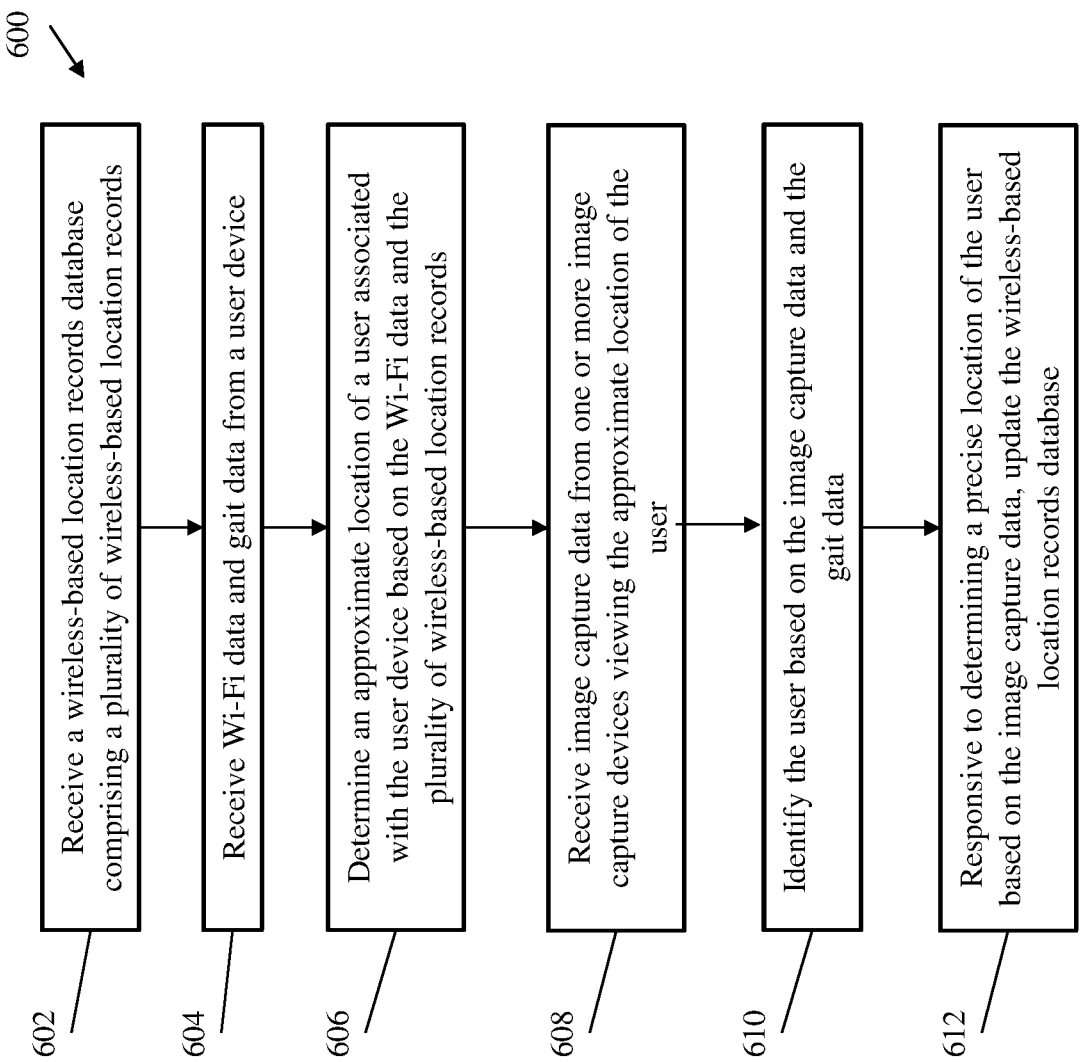
FIG. 6 depicts a flow diagram of a method for updating a wireless-based location records database to provide more accurate indoor positioning according to one or more embodiments of the invention.

Turning now to FIG. 6, a flow diagram of a method 600 for updating a wireless-based location records database to provide more accurate indoor positioning in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes receiving (e.g., via mapping server 510) a wireless-based location records database comprising a plurality of wireless-based location records. According to some embodiments, each wireless-based location record of the plurality of wireless-based location records can include a location and a corresponding received signal strength indicator (RSSI) vector that was measured at the location during an initialization phase, as described above with respect to FIG. 4A. An RSSI vector can be a representation of the received signal strengths of a set of detected Wi-Fi signals from a set of wireless access points.

As shown at block 604, the method includes receiving (e.g., via mapping server 510), from a user device 520, Wi-Fi data and gait data. According to some embodiments, the Wi-Fi data can include an RSSI vector obtained by the user device 520. For example, as a user of user device 520 walks through an indoor area, the user device 520 may detect signal strengths of various nearby WAPs and may report these detected WAP signal strengths as Wi-Fi data to mapping server 510. Similarly, as the user carrying user device 520 moves about the indoor location, a gait sensor 524 (e.g., an accelerometer or gyroscope) of user device 520 may obtain gait data that can be transmitted to mapping server 510.

As shown at block 606, the method includes determining (e.g., via mapping server 510) an approximate location of a user associated with the user device based on the Wi-Fi data and the plurality of wireless-based location records. According to some embodiments, determining the approximate location of user associated with the user device based on the Wi-Fi data and the plurality of wireless-based location records can include comparing the RSSI vector obtained by the user device to the wireless-based location records database to determine a set of most similar RSSI vectors of the plurality of wireless-based location records for example, as previously described above with respect to FIGS. 4A and 4B.

As shown at block 608, the method includes receiving (e.g., via property server 530) image capture data from one or more image capture devices viewing the approximate location of the user. For example, property server 530 may determine one or more video cameras that are configured to view the approximate location of the user and may access the video feeds of the one or more video cameras to perform a visual analysis of the video feeds.

As shown at block 610, the method includes identifying (e.g., via property server 530) the user based on the image capture data and the gait data. Identifying the user can mean determining which person of a plurality of people shown in the one or more video feeds is carrying the user device 520 that provided the gait data. Thus, according to some embodiments, identifying the user based on the image capture data and the gait data can include performing image analysis of the image capture data to identify a person depicted in the image capture data whose movements correlate to motion represented by the gait data, for example, in a manner similar to that previously described above.

As shown at block 612, the method includes updating (e.g., via mapping server 510) the wireless-based location records database in response to determining an accurate location of the user based on the image capture data. In some embodiments, determining an accurate location of the user based on the image capture data can include comparing the position of the user in the image capture data to a plurality of reference points in the image capture data and determining the distances between the position of the user in the image capture data and each of the plurality of reference points using visual distance measuring techniques, as previously described above. According to some embodiments, updating the wireless-based location records database can include generating a new wireless-based location record comprising the determined location of the user and the RSSI vector obtained by the user device and storing the new wireless-based location record in the wireless-based location records database.

According to some embodiments, the method may further include receiving new Wi-Fi data from a second user device and determining an accurate and/or precise location of the second user device with improved accuracy based on the updated wireless-based location records database. For example, if the second user is located at or near the location associated with the new wireless-based location record that was added to the wireless-based location records database during the update of the wireless-based location records database, then the mapping server 510 can use the new wireless-based location record as a reference to provide an accurate location of the second user that is more accurate than it likely would have been prior to the automatic updating of the wireless-based location records database having been performed.

According to some embodiments, identifying the user based on the image capture data and the gait data can include obtaining images of the user's face, clothing or other visual features and storing the visual features. Once obtained, these visual features can be used to assist in recognizing a user where limited visual gait information is available. For example, a threshold amount of visual gait data is needed to correlate the gait data (e.g., gyroscope data) with the visual gait data (i.e., a person's movements) of an individual. For example, the system may need a threshold of at least ten steps of visual gait data (i.e., image capture data showing the movement of a person's legs), however, in some cases the legs of an individual may be obscured from view of the cameras by other objects or items in a room. For example, if a person is walking around a department store, there may be several racks of clothing that obscure the view of the person's legs. However, once the stored visual features are associated with the identification of the user device (e.g., MAC address or other device-identifying information), the system can use these stored visual features to more quickly identify the person again without needing the threshold amount of visual gait data. Accordingly, in some embodiments, the method can further include receiving new Wi-Fi data, from the user device, determining a new approximate location of the user based on the new Wi-Fi data and the plurality of wireless-based location records, receiving new image capture data from one or more image capture devices viewing the new approximate location of the user, identifying the user based on the new image capture data and the images of the user's face or clothing, and updating the wireless-based location records database in response to determining a new accurate/precise location of the user based on the new image capture data.

Figure 7:
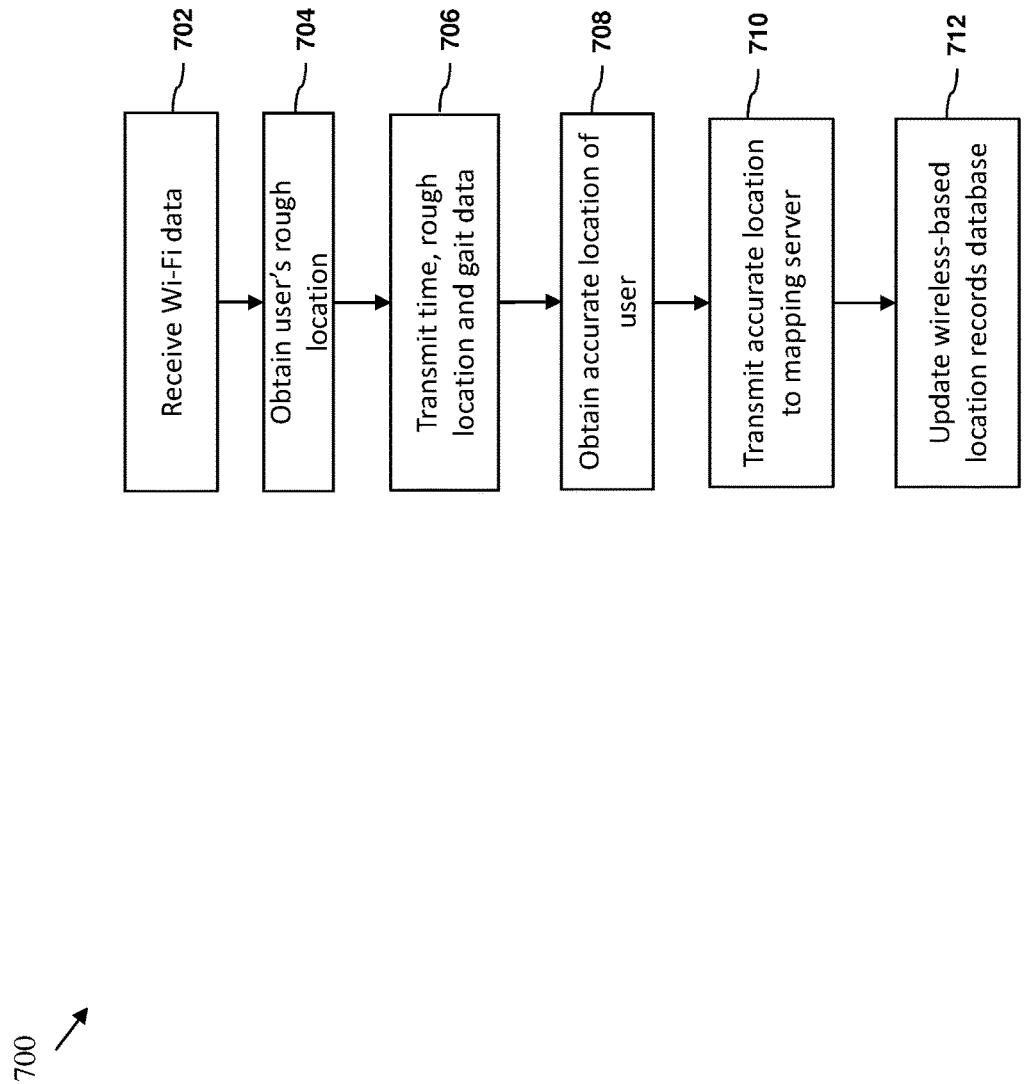
FIG. 7 depicts another flow diagram of a method for updating a wireless-based location records database to provide more accurate indoor positioning according to one or more embodiments of the invention.

FIG. 7 depicts a flow diagram of a method for updating a wireless-based location records database to provide more accurate indoor positioning according to one or more embodiments of the invention. In one or more embodiments of the present invention, the method 700 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 700 begins at block 702 and includes receiving (e.g., via mapping server 510) Wi-Fi data from a mobile device (e.g., user device 520). The Wi-Fi data may include an RSSI vector obtained by the mobile device, which, as previously described above, may represent the received signal strengths of a set of detected Wi-Fi signals from a set of wireless access points.

As shown in block 704, the method includes obtaining a user's rough or approximate location, for example, based on the Wi-Fi data (e.g., RSSI vector) from the user device 520 associated with user. According to some embodiments, the user's approximate location may be determined by mapping server 510 in a manner similar to that previously described above with respect to block 606, by comparing the RSSI vector to a plurality of wireless-based location records stored in the wireless-based location record database. As previously described above, each stored wireless-based location record can represent a stored RSSI vector that corresponds to a stored location. Thus, an approximate location of a user associated with user device 520 can be obtained by for example, determining the most similar stored RSSI vector to the received Wi-Fi data. In some embodiments, a rough location may be determined by extrapolating a rough location that corresponds to the received RSSI vector by triangulating the RSSI vectors with the closest stored RSSI vectors and their corresponding locations. As will be appreciated by those of skill in the art, there may be many different mathematical techniques or approaches that can be used to determine a rough location associated with the received RSSI vector in comparison to the plurality of stored wireless-based location records (i.e., stored RSSI vectors and corresponding locations), such as for example, trilateration or multilateration techniques. Thus, as the wireless-based location records database becomes populated with more and more accurate wireless-based location records, the rough locations determined by the system may become more and more accurate.

As shown in block 706, the method includes transmitting a time, rough location and gait data to a property server (e.g., property server 530). For example, according to some embodiments, a mapping server 510 that previously determined a rough location of the user in block 704 may transmit the determined rough location, the timestamp associated with the received Wi-Fi data, and gait data received from the user device 520 to the property server 510. According to some embodiments, the user device 520 may transmit gait data (e.g., data obtained from a gyroscope or similar sensor of user device 520) corresponding a timeframe proximate to the transmission of the Wi-Fi data at block 702 to the mapping server 510 for forwarding to the property server 530, or directly to the property server 530. For example, in some embodiments, a mobile application running on user device 520 may cause the user device 520 to both send the Wi-Fi data in block 702 and obtain and transmit gait data. According to some embodiments, the user device 520 may continue to obtain and transmit gait data to property server 530 for at least a predetermined amount of time after transmitting the Wi-Fi data, or until the user device 520 receives a notification (e.g., from property server 530 or mapping server 510) that the user has been successfully visually identified based the gait data and a video analysis, as described previously above.

As shown in block 708, the method includes determining (e.g., via property server 530) an accurate location of the user, based on the received time, location, and gait data in a manner similar to that described above with respect to blocks 608, 610 and 612. For example, the property server 530 can obtain video (e.g., from a security camera) of the approximate location proximate to the received time and can utilize the gait data in tandem with an image analysis of the video to visually identify the user associated with the user device 520 that sent the Wi-Fi data in block 702. Once visually identified, the property server 530 can apply further image analysis techniques to determine an accurate/precise location of the user using visual distance measuring techniques in view of reference points contained within the video images that have known locations.

As shown in block 710, the method includes transmitting (e.g., via property server 530) the accurate location to the mapping server 510. As shown in block 712, the method includes updating (e.g., via mapping server 510) the wireless-based location records database to include a new wireless-based location record that is made up of the RSSI vector received from the user device 520 at block 702 and the accurate location of the user determined at block 708. In this way, the wireless-based location records database may be automatically updated with new, more accurate wireless-based location records over time. According to some embodiments, if at block 708, the property server 530 was unable to obtain an accurate location of the user, because for example, the view of the user in the video feed was too obstructed to visually determine the identity of the user, then at block 710 the property server 530 may instead transmit the approximate location of the user back to the mapping server 510 and the mapping server 510 may discard this information at block 712 in lieu of updating the wireless-based location records database.

Figure 8:
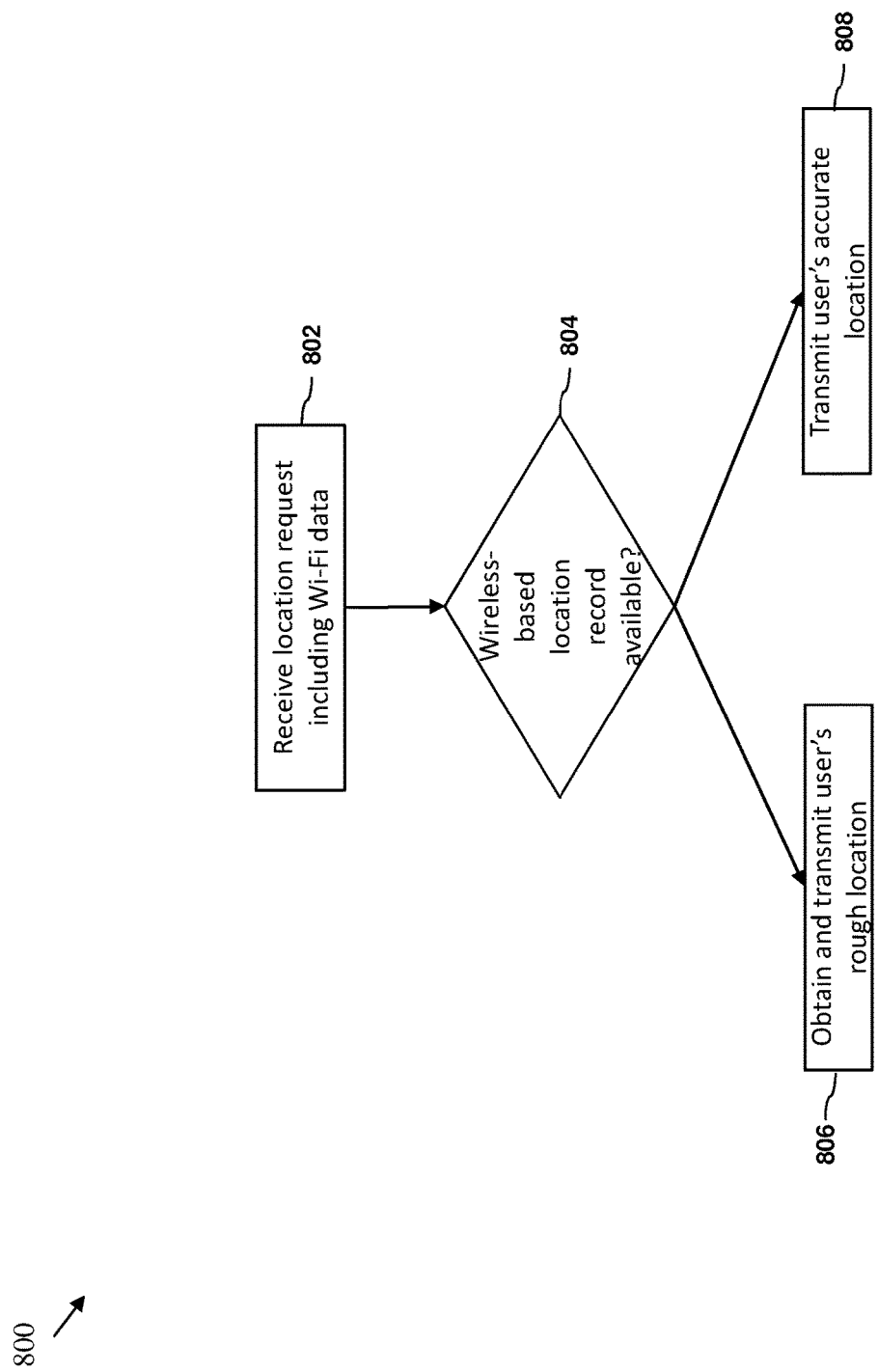
FIG. 8 depicts a flow diagram of a method for responding to a request for accurate indoor positioning according to one or more embodiments of the invention.

FIG. 8 depicts a flow diagram of a method for responding to a request for accurate indoor positioning according to one or more embodiments of the invention. In one or more embodiments of the present invention, the method 800 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 800 begins at block 802 and includes receiving (e.g., via a mapping server 510) a location request that includes Wi-Fi data. According to some embodiments, the request may be an electronic request generated by, for example, a mobile application running on a user device 520. The Wi-Fi data may include an RSSI vector obtained by the user device 520 in a manner similar to that described above with respect to block 604. According to various embodiments, the location request can be provided and responded to without the need for the user device 520 to provide gait data as part of the location request.

As shown at block 804, the method includes determining (e.g., via mapping server 510), if a wireless-based location record is available that matches the RSSI vector provided by the user device 520 in block 802. In other words, the mapping server 510 may determine if the received RSSI vector matches a stored RSSI vector of a plurality of RSSI vectors that are stored as part of a wireless-based location records database stored by the mapping server 510. According to some embodiments, the received RSSI vector may match a stored RSSI vector if each recorded signal strength of the received RSSI vector matches the corresponding stored signal strength of a stored RSSI vector. According to some embodiments, signal strengths may be said to match if the values of the received and stored signal strengths are identical. In some embodiments, the signal strengths may be said to match if the values of the received and stored signal strengths are within a predetermined range of one another or within a predetermined margin of error.

If the mapping server 510 determines that the received RSSI vector does not match a stored RSSI vector of the wireless-based location records database, then the method may proceed to block 806 where the mapping server 510 may determine a user's rough location based on the received RSSI vector and the stored wireless-based location records database in a manner similar to that as previously described above. The mapping server 510 may then transmit the approximate location to the user device 520. According to some embodiments, the mapping server 510 may also transmit an indication to the user device 520 that the location is an approximate location and in some embodiments the user device 520 may be configured to provide an indication to the user that the received location is an approximate location. If the mapping server 510 determines at block 804 that the received RSSI vector does match an RSSI vector of a stored wireless-based location record, then the mapping server 510 may transmit the location stored as part of the wireless-based location record to the user device 520 as the user's accurate location. According to some embodiments, the mapping server 510 may also transmit an indication to the user device 520 that the location is an accurate location and in some embodiments the user device 520 may be configured to provide an indication to the user that the received location is an accurate location. Thus, the techniques described herein may be utilized to quickly respond to a user request for accurate location of the user, based on the previous automatic updating of the wireless-based location records database as described above. According to some embodiments, such positioning may be performed in real-time or near real-time based on the repeated, continual and/or intermittent transmission of obtained RSSI vectors by the user device 520 and reciprocal receipt of positioning data from the mapping server 510. Thus, embodiments of the present disclosure may be used to, for instance, track the location of a user within a store, a building, or any other predefined area, in real-time or near real-time. As will be appreciated by those of skill in the art, such location information can be utilized by various applications running on a user device 520 to provide valuable functionalities, such as for example, an interactive map, a store guide, location-based games, or any other such applications that may utilize a user's accurate location to provide functionality through a user device 520.

Additional processes may also be included. It should be understood that the processes depicted in FIGS. 6, 7 and 8 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a wireless-based location records database comprising a plurality of wireless-based location records;
   receiving, from a user device, Wi-Fi data and gait data;
   determining an approximate location of a user associated with the user device based on the Wi-Fi data and the plurality of wireless-based location records;
   receiving image capture data from one or more image capture devices viewing the approximate location of the user;
   identifying the user based on the image capture data and the gait data; and
   responsive to determining an accurate location of the user based on the image capture data, updating the wireless-based location records database, wherein determining the accurate location of the user based on the image capture data comprises:
      comparing a position of the user in the image capture data to a plurality of reference points in the image capture data; and
      determining distances between the position of the user in the image capture data and each of the plurality of reference points using visual distance measuring techniques.

2. The computer-implemented method of claim 1, wherein each wireless-based location record of the plurality of wireless-based location records comprises a location and a corresponding received signal strength indicator (RSSI) vector.

3. The computer-implemented method of claim 2, wherein each RSSI vector comprises received signal strengths of a set of detected Wi-Fi signals from a set of wireless access points.

4. The computer-implemented method of claim 3, wherein the Wi-Fi data comprises an RSSI vector obtained by the user device.

5. The computer-implemented method of claim 4, wherein determining the approximate location of user associated with the user device based on the Wi-Fi data and the plurality of wireless-based location records comprises comparing the RSSI vector obtained by the user device to the wireless-based location records database to determine a set of most similar RSSI vectors of the plurality of wireless-based location records.

6. The computer-implemented method of claim 5, wherein updating the wireless-based location records database comprises generating a new wireless-based location record comprising the accurate location of the user and the RSSI vector obtained by the user device.

7. The computer-implemented method of claim 1, wherein identifying the user based on the image capture data and the gait data comprises performing image analysis of the image capture data to identify a person depicted in the image capture data whose movements correlate to motion represented by the gait data.

8. The computer-implemented method of claim 1, further comprising:
receiving new Wi-Fi data from a second user device; and
determining a location of the second user device based on the updated wireless-based location records database.

9. The computer-implemented method of claim 1, wherein identifying the user based on the image capture data and the gait data comprises obtaining images of the user's face or clothing, the method further comprising:
receiving, from the user device, new Wi-Fi data;
determining a new approximate location of the user based on the new Wi-Fi data and the plurality of wireless-based location records;
receiving new image capture data from one or more image capture devices viewing the new approximate location of the user; and
identifying the user based on the new image capture data and the images of the user's face or clothing; and
responsive to determining a new accurate location of the user based on the new image capture data, updating the wireless-based location records database.

10. A system comprising:
a processor communicatively coupled to a memory, the processor configured to:
receive a wireless-based location records database comprising a plurality of wireless-based location records;
receive, from a user device, Wi-Fi data and gait data;
determine an approximate location of a user associated with the user device based on the Wi-Fi data and the plurality of wireless-based location records;
receive image capture data from one or more image capture devices viewing the approximate location of the user;
identify the user based on the image capture data and the gait data; and
responsive to determining an accurate location of the user based on the image capture data, update the wireless-based location records database, wherein determining the accurate location of the user based on the image capture data comprises:
comparing a position of the user in the image capture data to a plurality of reference points in the image capture data; and
determining distances between the position of the user in the image capture data and each of the plurality of reference points using visual distance measuring techniques.

11. The system of claim 10, wherein each wireless-based location record of the plurality of wireless-based location records comprises a location and a corresponding received signal strength indicator (RSSI) vector.

12. The system of claim 11, wherein each RSSI vector comprises received signal strengths of a set of detected Wi-Fi signals from a set of wireless access points.

13. The system of claim 12, wherein the Wi-Fi data comprises an RSSI vector obtained by the user device.

14. The system of claim 13, wherein determining the approximate location of user associated with the user device based on the Wi-Fi data and the plurality of wireless-based location records comprises comparing the RSSI vector obtained by the user device to the wireless-based location records database to determine a set of most similar RSSI vectors of the plurality of wireless-based location records.

15. The system of claim 10, wherein identifying the user based on the image capture data and the gait data comprises performing image analysis of the image capture data to identify a person depicted in the image capture data whose movements correlate to motion represented by the gait data.

16. A computer program product comprising a computer readable storage medium having program instructions embodied therewith the program instructions executable by a computer processor to cause the computer processor to perform a method comprising:
receiving a wireless-based location records database comprising a plurality of wireless-based location records;
receiving, from a user device, Wi-Fi data and gait data;
determining an approximate location of a user associated with the user device based on the Wi-Fi data and the plurality of wireless-based location records;
receiving image capture data from one or more image capture devices viewing the approximate location of the user;
identifying the user based on the image capture data and the gait data; and
responsive to determining an accurate location of the user based on the image capture data, updating the wireless-based location records database, wherein determining the accurate location of the user based on the image capture data comprises:
comparing a position of the user in the image capture data to a plurality of reference points in the image capture data; and
determining distances between the position of the user in the image capture data and each of the plurality of reference points using visual distance measuring techniques.

17. The computer program product of claim 16, wherein each wireless-based location record of the plurality of wireless-based location records comprises a location and a corresponding received signal strength indicator (RSSI) vector.

18. The computer program product of claim 17, wherein each RSSI vector comprises received signal strengths of a set of detected Wi-Fi signals from a set of wireless access points.

19. The computer program product of claim 18, wherein the Wi-Fi data comprises an RSSI vector obtained by the user device.

\* \* \* \* \*